United States Patent
Moran et al.

(10) Patent No.: US 10,287,017 B2
(45) Date of Patent: May 14, 2019

(54) CONVERTIBLE CHILLED STOWAGE COMPARTMENT IN AN AIRCRAFT

(71) Applicant: THE BOEING COMPANY, Chicago, IL (US)

(72) Inventors: Thomas Joseph Moran, Lake Stevens, WA (US); David Andrew Lutz, Summerville, SC (US)

(73) Assignee: The Boeing Company, Chicago, IL (US)

(*) Notice: Subject to any disclaimer, the term of this patent is extended or adjusted under 35 U.S.C. 154(b) by 410 days.

(21) Appl. No.: 15/097,411

(22) Filed: Apr. 13, 2016

(65) Prior Publication Data

US 2017/0297717 A1   Oct. 19, 2017

(51) Int. Cl.
*B64D 11/04* (2006.01)
*B64D 11/00* (2006.01)
*F25D 23/06* (2006.01)
*F25D 23/12* (2006.01)

(52) U.S. Cl.
CPC ............ *B64D 11/04* (2013.01); *B64D 11/003* (2013.01); *F25D 23/069* (2013.01); *F25D 23/12* (2013.01); *F25D 2400/16* (2013.01); *Y02T 50/46* (2013.01)

(58) Field of Classification Search
CPC ....... B64D 11/04; B64D 11/003; F25D 23/12; F25D 23/069; F25D 2400/16; Y02T 50/46
See application file for complete search history.

(56) References Cited

U.S. PATENT DOCUMENTS

| 3,872,688 A | 3/1975 | Tillman |
| 6,547,183 B2 | 4/2003 | Farnsworth |
| 6,693,260 B1 * | 2/2004 | Rodrigues ............... F25D 23/12 165/58 |

(Continued)

FOREIGN PATENT DOCUMENTS

| EP | 2078908 | * 7/2009 | ............. F25D 17/04 |
| EP | 2078908 A2 | 7/2009 | |
| EP | 2933190 A1 | 10/2015 | |

OTHER PUBLICATIONS

Extended European Search Report for corresponding EP Application No. 17165841.2-1754 dated Aug. 14, 2017 (7 pages).

(Continued)

*Primary Examiner* — Assres H Woldemaryam
(74) *Attorney, Agent, or Firm* — Jay J. Hoette; The Small Patent Law Group, LLC

(57) ABSTRACT

An aircraft includes a cabin wall defining a cabin and a convertible monument in the cabin adjacent the cabin wall. The convertible monument has a plurality of monument walls defining sides, a front and a rear of the monument surrounding a chamber defined by the monument walls. The convertible monument has a closet component positioned in the chamber for supporting non-perishable items in the chamber. The chamber has a convertible area convertible between a cooling compartment and an uncooled compartment. A chiller is positioned in the chamber proximate the convertible area. The chiller is configured to supply cool air to the cooling compartment when operated for cooling perishable items stowed in the cooling compartment. The convertible area is used as an uncooled compartment for stowing non-perishable items when the chiller is inactive.

20 Claims, 3 Drawing Sheets

(56) References Cited

U.S. PATENT DOCUMENTS

| | | | |
|---|---|---|---|
| 6,761,332 | B1 | 7/2004 | Bengtsson |
| 6,845,627 | B1 * | 1/2005 | Buck .............. B64D 11/04 165/919 |
| 8,519,824 | B1 | 8/2013 | Rankin et al. |
| 9,079,668 | B2 | 7/2015 | Gee et al. |
| 2001/0050519 | A1 | 12/2001 | Kasuya |
| 2005/0210910 | A1 * | 9/2005 | Rigney .......... B60H 1/00014 62/407 |
| 2013/0047657 | A1 * | 2/2013 | Oswald .............. B64D 11/04 62/407 |
| 2013/0219948 | A1 * | 8/2013 | Aurekoski ....... B64D 11/0007 62/457.1 |
| 2014/0125092 | A1 * | 5/2014 | Schreuder ........... B64D 11/00 297/163 |
| 2015/0007600 | A1 | 1/2015 | Godecker et al. |
| 2015/0069891 | A1 | 3/2015 | Schimanowski et al. |
| 2015/0289643 | A1 * | 10/2015 | Holtorf ........... B64D 11/0007 62/98 |

OTHER PUBLICATIONS

Maryann Simson; Suppliers Innovate for Monumental Gains; Webpage; Apr. 16, 2015; 4 pages.

* cited by examiner

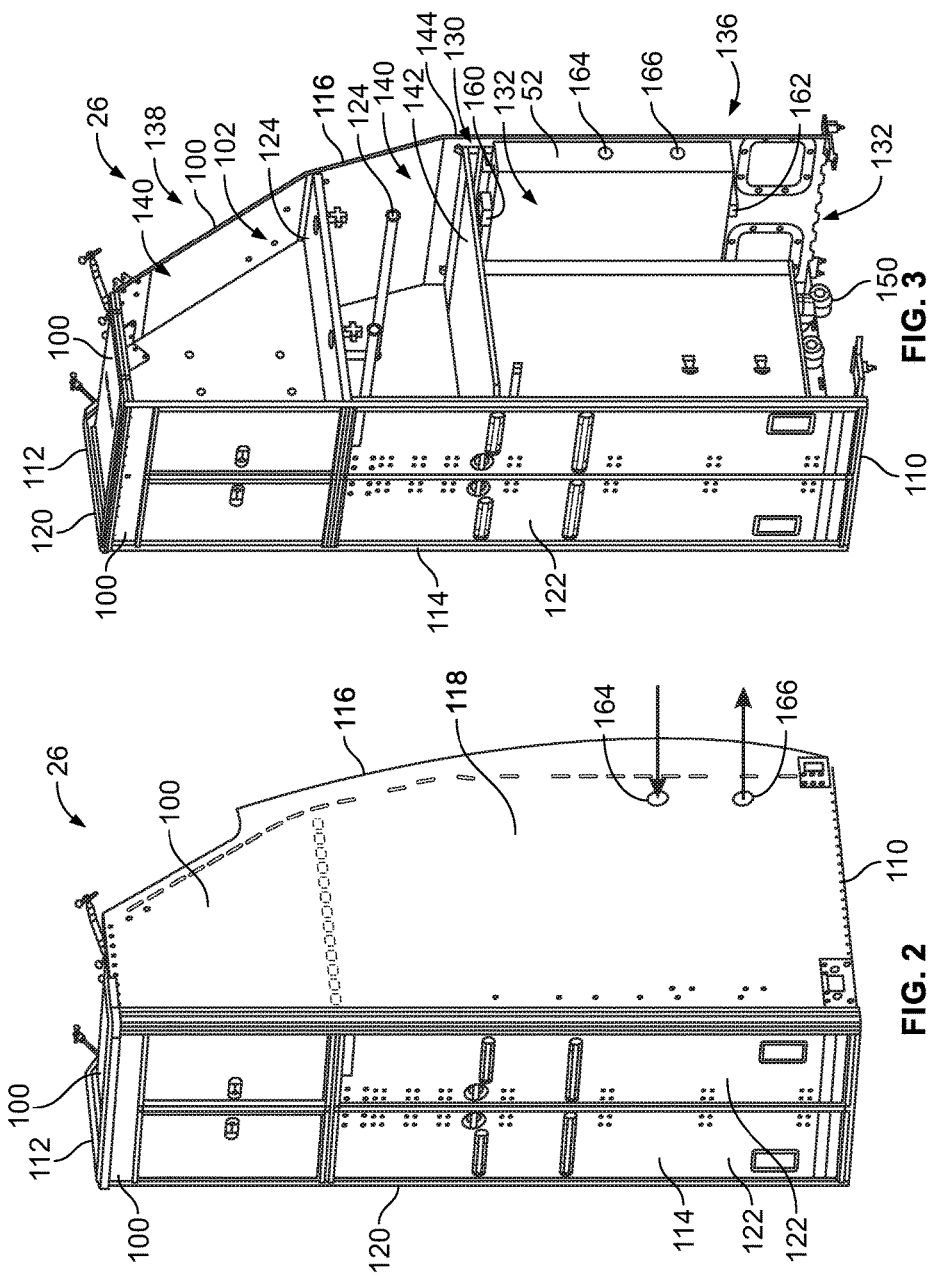

CONVERTIBLE CHILLED STOWAGE COMPARTMENT IN AN AIRCRAFT

BACKGROUND

The present disclosure relates generally to convertible chilled stowage compartments in aircraft.

Aircraft can include multiple galleys to store food and beverages on the aircraft. The food and beverages are typically stored in galley carts which are transported to the aircraft and stored in refrigerated compartments or zones in the galleys. A refrigeration system is provided to supply cooled air to the cooling compartments. The galleys occupy cabin space, reducing the amount of space available for revenue generating passenger seats. As such, the number of galleys and size of the galleys tends to be as limited as possible to maximize the number of passenger seats. However, in some aircraft, the amount of galley space may be insufficient. For example, on long flights a greater amount of food and beverages may be needed. Additionally, some return airports do not have sufficient catering service so additional food and beverages may be needed for the return flight. However, such additional perishable food and beverage storage space may not be needed on every flight.

SUMMARY

In accordance with one embodiment, an aircraft is provided including a cabin wall defining a cabin and a convertible monument in the cabin adjacent the cabin wall. The convertible monument has a plurality of monument walls defining sides, a front and a rear of the monument surrounding a chamber defined by the monument walls. The convertible monument has a closet component positioned in the chamber for supporting non-perishable items in the chamber. The chamber has a convertible area convertible between a cooling compartment and an uncooled compartment. A chiller is positioned in the chamber proximate the convertible area. The chiller is configured to supply cool air to the cooling compartment when operated for cooling perishable items stowed in the cooling compartment. The convertible area is used as an uncooled compartment for stowing non-perishable items when the chiller is inactive.

In accordance with another embodiment, an aircraft is provided including a cabin wall defining a cabin and a convertible monument in the cabin adjacent the cabin wall. The convertible monument has a plurality of monument walls defining sides, a front and a rear of the monument surrounding a chamber defined by the monument walls. The convertible monument has a closet component positioned in the chamber for supporting non-perishable items in the chamber. The convertible monument has an adjustable panel in the chamber movable between a retracted position and an extended position. In the extended position, the adjustable panel divides the chamber into a cooling compartment below the adjustable panel and an uncooled compartment above the adjustable panel. A chiller is positioned in the chamber below the adjustable panel. The chiller is configured to supply cool air to the cooling compartment when the adjustable panel is in the extended position. The cooling compartment is configured to stow perishable items therein. A volume of the uncooled compartment is greater when the adjustable panel is in the retracted position. The uncooled compartment is configured to stow non-perishable items therein.

In accordance with yet another embodiment, a convertible monument is provided including monument walls defining sides, a front and a rear of the monument extending between a top and a bottom of the monument. The monument walls surround a chamber having a convertible area at the bottom of the monument being convertible between a cooling compartment and an uncooled compartment. A closet component is positioned in the chamber for supporting non-perishable items in the uncooled compartment of the chamber. A chiller is positioned in the chamber proximate the convertible area. The chiller is configured to supply cool air to the cooling compartment when operated for cooling perishable items stowed in the cooling compartment. The convertible area is used as an uncooled compartment for stowing non-perishable items when the chiller is inactive.

The features and functions that have been discussed can be achieved independently in various embodiments or may be combined in yet other embodiments, further details of which can be seen with reference to the following description and drawings.

BRIEF DESCRIPTION OF THE DRAWINGS

FIG. 2 is a front perspective view of a convertible monument of the aircraft in accordance with an exemplary embodiment.

FIG. 3 is a partial sectional view of the convertible monument converted to a cooling arrangement.

DETAILED DESCRIPTION

Figure 1:
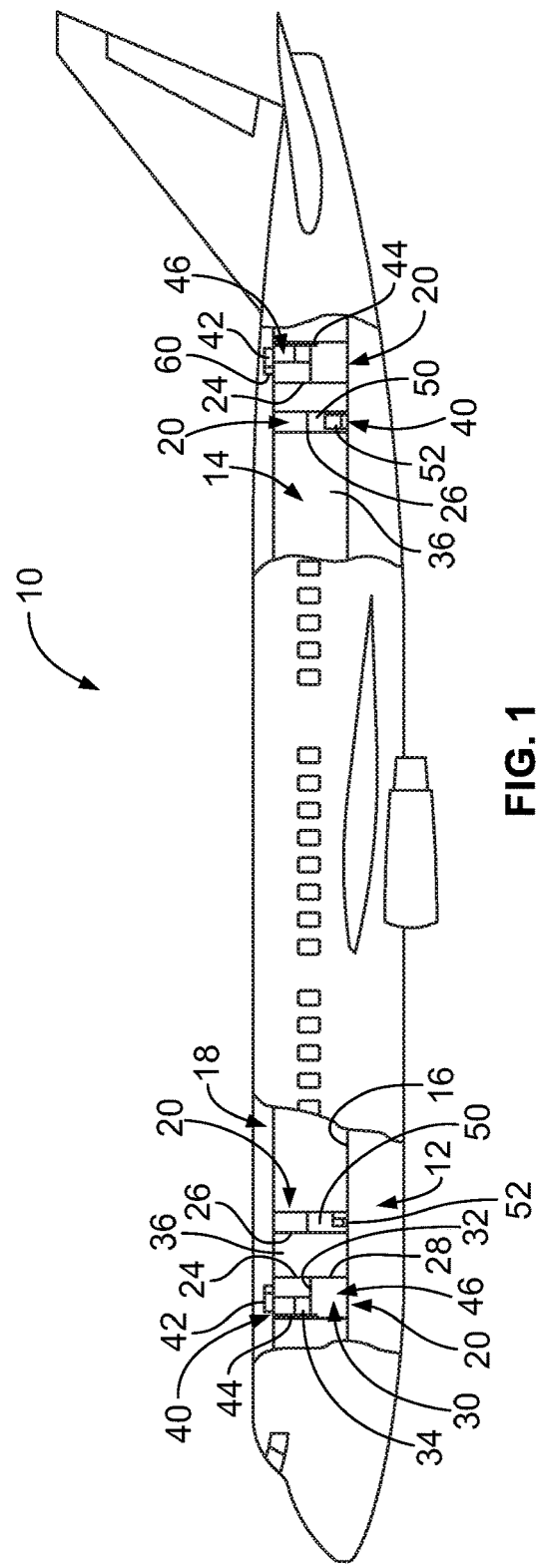
FIG. 1 is a cross-sectional schematic view of an aircraft in accordance with an exemplary embodiment.

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The embodiments described herein provide a convertible space that is able to be used for stowing galley carts or standard containers holding items requiring cooling when needed, such space being convertible to non-cooled stowage space when cooling is not needed to allow for stowage of non-perishable items such as luggage, passenger coats, and the like. More specifically, described herein are various embodiments of a convertible monument for an aircraft that allows stowage of non-perishable items, such as luggage or passengers coats in normal use, but is convertible to a refrigerated compartment for stowage of galley carts or cooled stowage containers when demand for cooling compartments is higher than provided by the galleys of the aircraft. In various embodiments, the convertible monument is a closet having closet components, such as rods or shelves, for supporting items such as luggage or passenger coats. The convertible monument includes a chiller that may be operated to convert at least a portion of the closet into a cooling compartment. For instance, in various embodiments, the lower portion of the closet may be closed off and cooled by the chiller to receive galley carts or stowage containers. Various embodiments provide a plumbing-free chiller configured to discharge the condensate without the need for drainage plumbing so the chiller may be easily used in the convertible monument without the need for routing of plumbing to the convertible monument. For example, the closet may be easily retrofit with the plumbing-free chiller. In various embodiments, the chiller is provided at the rear of the convertible monument to minimize the impact on the user-friendly stowage space near the front.

FIG. 1 is a cross-sectional schematic view of an aircraft 10 in accordance with an exemplary embodiment. The aircraft 10 includes a fuselage defining an exterior of the aircraft 10. The aircraft 10 includes a cargo area 12 within a lower portion of the aircraft 10. The aircraft 10 includes a cabin 14 above the cargo area 12. The cargo area 12 is separated from the cabin 14 by a floor 16. The aircraft 10 includes a crown 18 in an overhead area above the cabin 14.

The aircraft 10 includes a plurality of monuments 20 arranged in the cabin 14. The monuments 20 define compartments of the aircraft 10 for stowing items within the cabin 14. For example, the aircraft includes one or more galleys 24 in the cabin 14 for stowage of catering items, such as perishable item stowage, including food and beverage stowage. The aircraft 10 includes one or more closets 26 in the cabin 14 for general stowage, such as stowage of luggage, passenger coats, and other non-perishable miscellaneous items. In an exemplary embodiment, at least some of the closets 26 are convertible to cooling compartments for stowing additional perishable items. Such closets 26 define convertible monuments that have the dual purpose of stowing general items and stowing items needing cooling, depending on need. Such closets may be referred to hereinafter as convertible monuments 26. The convertible monuments 26 may be other types of monuments other than closets, such as equipment monuments, such as video equipment monuments, purser workstations, and the like.

The galley 24 is an area accessible by the crew of the aircraft 10 stowing items used to serve the passengers, such as food, beverages, and the like. The galley 24 includes a plurality of walls 28 extending between the floor 16 and the crown 18. The walls 28 define one or more cart compartments 30, which are typically arranged below a counter 32 of the galley 24, and one or more stowage compartments 34, which are typically arranged above the counter 32. At least one of the walls 28 may abut against a cabin wall 36 defined by the fuselage. The galley area is separated from the passenger area where passenger seats are located. The galley 24 has a working area for the galley crew where galley carts in the cart compartments 30, counter 32 and standard containers in the stowage compartments 34 may be accessed. Space dedicated to the galley 24 is unusable for passenger seats or other purposes such as lavatories, and thus it may be desirable for aircraft manufacturers to reduce the footprint of the galley 24 in order to increase the passenger area to increase revenue of each flight for aircraft operators. The galley 24 may include any number of cart compartments 30 and stowage compartments 34 and the aircraft 10 may include any number of galleys 24.

The galley 24 includes a refrigeration system 40 that provides cooled air for the galley 24. Components of the refrigeration system 40 may be positioned above the galley 24 (e.g., in the crown 18 of the aircraft 10), may be positioned in the galley 24, and/or may be positioned below the galley 24 (e.g., in the cargo area 12 of the aircraft 10 below the floor 16). In an exemplary embodiment, the refrigeration system 40 includes at least one liquid heat exchange loop and at least one air heat exchange loops in flow communication with the liquid heat exchange loop(s). The liquid heat exchange loop is used to supply cold liquid to the air heat exchange loop(s) for heat transfer. In an exemplary embodiment, the liquid heat exchange loop includes a chiller 42. The air heat exchange loop(s) includes air ducts 44 used to move airflow, such as to one or more of the cart compartments 30 and/or to one or more of the stowage compartments 34. Any compartment receiving cooled airflow from the chiller 42 is referred to as a cooling compartment 46. For example, any of the cart compartments 30 may be cooling compartments 46 if receiving cooling airflow from the chiller 42. Any of the stowage compartments 34 may be cooling compartments 46 if receiving cooling airflow from the chiller 42.

Conventional aircraft are limited in the number of galley carts and standard containers on board to the number of cooling compartments 46 in the galleys 24 as the cooling is limited to the refrigeration system 40 associated with the galleys 24. The other monuments 20 in conventional aircrafts serve other purposes, such as stowage of non-perishable items, such as luggage and passenger coats. For example, the closets 26 in conventional aircraft do not include chillers and do not have any cooling capability. Typically, aircraft 10 fly many different routes and each route may have different requirements. For example, some flights may be short flights (e.g., commuter flights) while other flights may be long flights (e.g., cross-country or international flights). The short flights may have a lower demand for food or beverages, and thus fewer galley carts and cooled standard containers are needed on such flights as compared to long flights, where more meals and beverages are served. Additionally, short flights may have a higher demand for luggage stowage in the cabin 14 as passengers tend to travel with carry-on luggage on shorter flights as opposed to stowed luggage for longer flights. Furthermore, in some situations the food and beverages for multiple flights are loaded into the aircraft 10, such as when the subsequent airport does not offer catering service. Designing the aircraft 10 with the appropriate amount of galley space may not be possible or practical due to the different demands for cooling storage of food and beverages on the various flights of the aircraft 10. For example, dedicating more space to the galleys 24 may limit the space available for closets 26 and/or passenger seats, and vice versa.

In an exemplary embodiment, the aircraft 10 includes one or more convertible monuments 26 that provide the ability to have additional cooling compartments outside of the galleys 24. For example, any of the closets may be convertible monuments 26 having convertible space therein that may be used for a cooling compartment 50. The convertible monuments 26 include a point of use chiller 52 that may be operated to cool the cooling compartment 50. For example, when there is high demand for stowage of galley carts or cooled standard containers, the galley carts or cooled standard containers may be loaded into the cooling compartment 50 of the convertible monument 26 and the chiller 52 may be operated to cool the galley carts or cooled standard containers. However, when there is low demand for stowage of galley carts or cooled standard containers or when the demand does not exceed the available space in the galleys 24, the convertible monument 26 may be used as an uncooled closet. For example, the chiller may be inactive such that the compartment or space in the convertible monument 26 is not cooled. Such space may be used for stowage of non-perishable items, such as luggage or passenger coats.

In an exemplary embodiment, the refrigeration systems associated with the convertible monuments 26, including the chillers 52, are plumbing-free. The chillers 52 have condensate removal systems for removing condensate produced by the chillers 52 without the need for draining the condensate away from the chillers 52. As such, piping, valves, wire harnesses, circuit breakers for operating the valves, and the like are not necessary for removing the condensate from the chillers 52. The chillers 52 and associated condensate removal systems are configured to be used in the convertible monuments 26 without the need for routing plumbing to the convertible monuments 26, which reduces the weight and cost and provides more space for stowing items in the convertible monuments 26. In various embodiments, the condensate may be exhausted into exhaust airflow from the chillers 52, such as into the cabin 14 or into the cargo area 12. In other various embodiments, the convertible monuments 26 may have plumbing, such as in the cargo area 12 for draining the condensate.

The refrigeration systems of the chillers 42 and/or the chillers 52 use a refrigeration cycle to supply the chilled airflow to the cooling compartments 46, 50, respectively. The chillers 42, 52 include a compressor, a condenser, and an evaporator, with refrigerant lines therebetween. The refrigerant undergoes temperature changes and phase changes when the chiller 42 is operated. The chiller 42 transfers heat between the refrigerant and the airflow through the air ducts 44.

Figure 4:
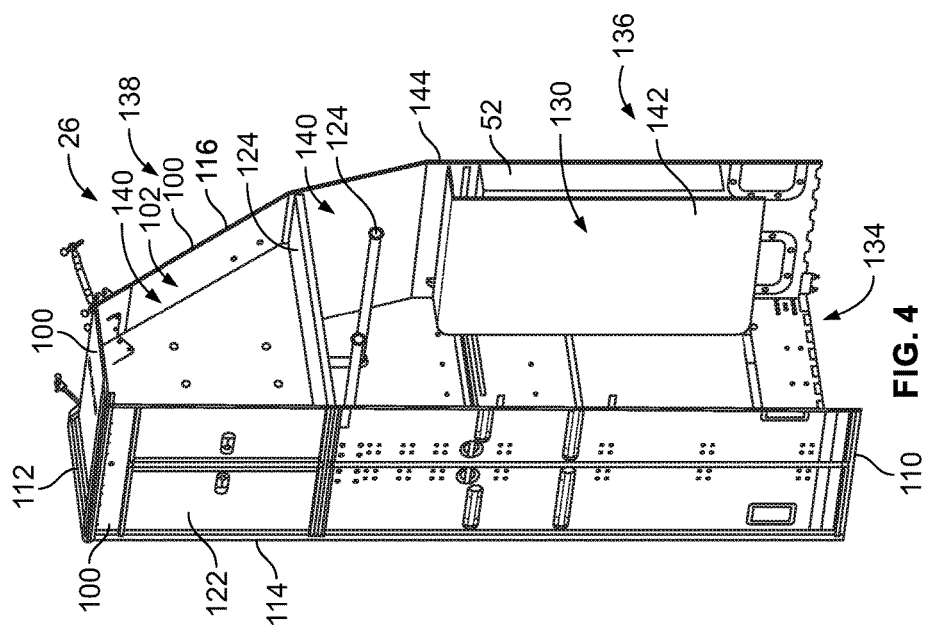
FIG. 4 is another partial sectional view of the convertible monument converted to a non-cooling arrangement.

FIG. 2 is a front perspective view of the convertible monument 26 in accordance with an exemplary embodiment. FIG. 3 is a partial sectional view of the convertible monument 26 and chiller 52 in accordance with an exemplary embodiment converted to a cooling arrangement. FIG. 4 is another partial sectional view of the convertible monument 26 and chiller 52 in accordance with an exemplary embodiment converted to a non-cooling arrangement. In some various embodiments, to increase the number of catering items (e.g., food or beverages) on a flight, it may be desirable to convert or retrofit the closet 26 to include a cooling ability.

The convertible monument 26 includes a plurality of monument walls 100 surrounding a chamber 102. The monument walls 100 define a bottom 110, which may be at the floor 16 (FIG. 1), a top 112, which may be at the crown 18 (FIG. 1), a front 114, a rear 116 opposite the front 114, and sides 118, 120. In an exemplary embodiment, the rear 116 faces the cabin wall 36 (FIG. 1) and may be curved or angled to follow the curvature of the cabin wall 36. For example, the convertible monument 26 may be deeper at the bottom 110 and narrower at the top 112 because the rear 116 is positioned further from the front 114 at the bottom 110 than at the top 112. Other orientations are possible in alternative embodiments.

The convertible monument 26 includes doors 122 at the front 114 for accessing the chamber 102. Multiple doors 122 may be provided for accessing different portions of the chamber 102, such as an upper portion, a middle portion, a lower portion, and the like. In an exemplary embodiment, the convertible monument 26 includes one or more closet components 124 in the chamber 102 for supporting items in the chamber 102. For example, the closet components 124 may include hanging rods for hanging passenger coats or other wearable articles. The hanging rods may be adjustable or may be stationary and fixed in the convertible monument 26. The closet components 124 may include shelves for supporting items such as luggage. The shelves may be adjustable or may be stationary and fixed in the convertible monument 26.

In an exemplary embodiment, the convertible monument 26 includes a convertible area 130 being convertible between a cooling compartment 132 (FIG. 3) and an uncooled compartment 134 (FIG. 4). The chiller 52 is operated to convert the convertible area 130 into the cooling compartment 132. The convertible area 130 defines the uncooled compartment 134 when the chiller 52 is inactive, such as when the chiller 52 is idle or when the chiller 52 is off. In the illustrated embodiment, the convertible area 130 is only a portion of the chamber 102, such as a lower portion 136 of the chamber 102. An upper portion 138 of the chamber 102 above the convertible area 130 includes one or more uncooled compartments 140, also referred to as upper compartments 140. The upper compartments 140 may remain unchanged as the convertible area 130 is converted between the cooling compartment 132 and the uncooled compartment 134. Optionally, the upper compartments 140 include the closet components 124 and may be used to stow the non-perishable uncooled items irrespective of how the convertible area 130 is used. For example, the upper compartments 140 may store luggage, uncooled standard containers, passenger coats or other miscellaneous items. In an exemplary embodiment, the upper compartment 140 is opened to the uncooled compartment 134 when the convertible area 130 is converted as an uncooled compartment 134 and the upper compartment 140 is closed from the cooling compartment 132 when the convertible area 130 is converted as a cooling compartment 132. In other various embodiments, the upper compartment 140 may form a cooled compartment, such as including a separate chiller 52 or by using the chiller 52 in the lower portion of the convertible monument 26 for cooling.

In an exemplary embodiment, a divider panel 142 is positioned between the upper portion 138 and the lower portion 136. The divider panel 142 is provided at a top of the convertible area 130 and closes off the convertible area 130 from the upper compartment 140. The divider panel 142 encloses the convertible area 130 to keep the cooled air in the cooling compartment 132 when the convertible monument 26 is converted to a cooling use. Optionally, the divider panel 142 is an adjustable panel and may be referred to hereinafter as adjustable panel 142. The divider panel 142 may be variably positionable within the convertible monument 26 (for example, positionable at various heights within the convertible monument 26) to change the size of the convertible area 130. In other various embodiments, the convertible monument 26 may be utilized without the divider panel 142, such as when the entire compartment defines the convertible area 130. Optionally, multiple divider panels 142 may be provided.

The adjustable panel 142 may be movable between various positions or states (for example, open or closed). The adjustable panel 142 may open up the uncooled compartment 134 to the uncooled compartments 140 to form an enlarged, uncooled compartment, such as for hanging personal items, such as passenger's coats. When the convertible area 130 is opened up to the upper compartments 140, the volume of uncooled stowage area is enlarged. For example, over-sized non-perishable items too large to fit in the upper compartment 140 are configured to be received in both the upper compartment 140 and the uncooled compartment 134 when the convertible area 130 is converted as the uncooled compartment 134, such as when the adjustable panel 142 is retracted. The adjustable panel 142 may be hingedly coupled to one of the monument walls 100 and movable between an extended position (FIG. 3) and a retracted position (FIG. 4). In the retracted position, the adjustable panel 142 may at least partially cover the chiller 52. In the illustrated embodiment, the adjustable panel 142 is oriented generally horizontally between the sides 118, 120 and between the front 114 and the rear 116 in the extended position and is oriented generally vertically in the retracted position. Other orientations are possible in alternative embodiments.

In various embodiments, the adjustable panel 142 may be removable from the chamber 102. The adjustable panel 142 may be variably positionable within the convertible monument 26, such as attachable at various positions along a rack, to adjust the size of the convertible area 130 and thus the size of the cooling compartment 132, the lower compartment 134 and/or the upper compartment 140. Optionally, the divider panel 142 may be sealed to one or more of the monument walls 100 in the extended position to enclose the cooling compartment 132 to seal the cool air in the cooling compartment 132.

The chiller 52 is positioned in the chamber 102 proximate to the convertible area 130. The chiller 52 may be removably coupled to the convertible monument 26. In various embodiments, the chiller 52 is positioned proximate to the bottom 110 of the chamber 102 at the rear 116. Having the chiller 52 at the rear 116 at the bottom 110 positions the chiller 52 in an otherwise infrequently used an inaccessible space of the convertible monument 26 because the chiller 52 is low to the ground and far from the doors 122 at the front 114. Optionally, the cooling compartment 132 is defined between the chiller 52 and the front 114 of the convertible monument 26. In the illustrated embodiment, the chiller 52 is mounted to a rear wall 144 at the rear 116 of the convertible monument 26. The rear wall 144 may be a wall of the convertible monument 26, or alternatively, may be the cabin wall 36 (FIG. 1). The chiller 52 may be provided in the convertible area 130 for cooling the cooling compartment 132 when the chiller 52 is operated. In other various embodiments, the chiller 52 may be in fluid communication with the cooling compartment 132 to supply cooled airflow to the cooling compartment 132 through air ducts. The chiller 52 may be positioned behind a rear wall of the convertible monument 26 at the rear 116. The chiller 52 may be positioned below the floor 16 under the bottom 110 of the convertible monument 26. The chiller 52 may be positioned above the divider panel 142 to provide more space in the convertible area 130, such as for galley carts 150 or cooled standard containers (not shown). The chiller 52 may supply cooled air to the galley carts 150 in an air-through-cart supply arrangement or an air-over-cart arrangement. Optionally, the cooling compartment 132 may be sized and shaped to receive multiple galley carts 150, such as two galley carts 150 side-by-side. Optionally, multiple chillers 52 may be used within the convertible monument 26 to control an amount of cooling airflow to the convertible monument 26.

The chiller 52 includes a chilled air supply 160 and a chilled air return 162. The air is circulated from the return 162, through the evaporator and through the supply 160 into the cooled compartment 132. The air flowing over the evaporator is cooled and the cooled airflow is directed through the supply 160 to the cooling compartment 132, such as for cooling the galley carts 150 or standard containers. The chilled air circuit may include other components, such as filters, bypass ducts, vents and the like for controlling airflow through the chiller 52. Optionally, the supply 160 and/or the return 162 may include air ducts.

The chiller 52 includes a condenser air intake vent 164 (FIG. 2) and a condenser air exhaust vent 166 (FIG. 2). Air is forced through the condenser to cool the condenser. Exhaust air is forced into the air exhaust vent and discharged from the chiller 52. In the illustrated embodiment, the air is exhausted to an exterior of the convertible monument 26. Optionally, the condensate from the evaporator may be injected into the exhaust air by a condensate removal system. In the illustrated embodiment, the intake and exhaust vents 164, 166 are provided on the side 118 of the convertible monument 26; however the intake vent 164 and/or the exhaust vent 166 may be provided elsewhere, such as on the rear wall 144, on a divider panel 142, at the floor 16 or elsewhere.

Figure 5:
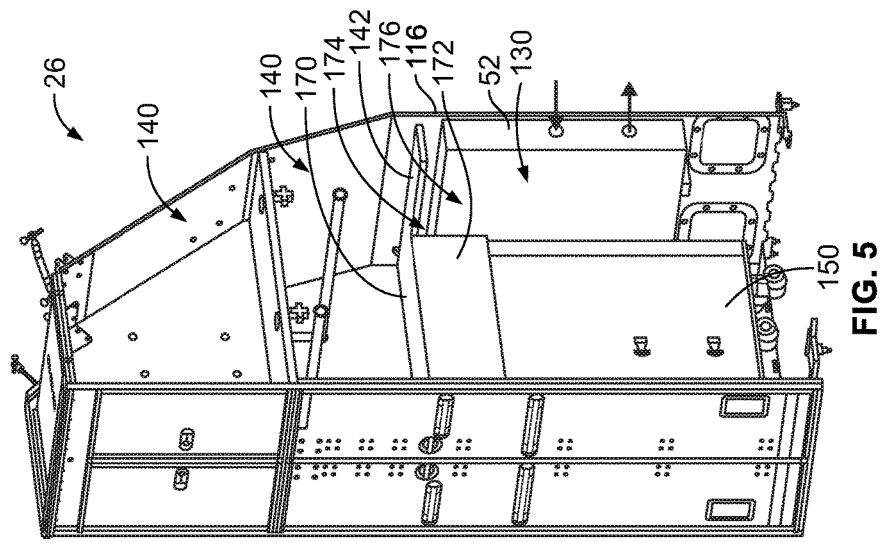
FIG. 5 is a partial sectional view of the convertible monument in accordance with an exemplary embodiment.

FIG. 5 is a partial sectional view of the convertible monument 26 and chiller 52 in accordance with an exemplary embodiment. The adjustable panel 142 illustrated in FIG. 5 is adjustable to change a size of the convertible area 130. For example, the adjustable panel 142 may be split and folded into first and second panels 170, 172. The first panel 172 is horizontal whereas the second panel 172 is vertical. Folding the second panel 172 downward divides the convertible area 130 into both a cooling compartment 174 and an uncooled compartment 176. For example, the convertible area 130 may be approximately divided in half with the cooling compartment 174 receiving one of the galley carts 150 and the uncooled compartment 176 being open to the upper compartment 140. Large items, such as passenger's coats may be held in the convertible monument 26 in the upper compartment 140 and the uncooled compartment 176, while still using part of the convertible area 130 is the cooling compartment 174. The cooling compartment 174 may be on the side of the chiller 52 having the air supply and return. The convertible area 130 is configured to be divided vertically by the second panel 172 to define the cooling compartment 174 and the uncooled compartment 176 arranged side-by-side.

In the illustrated embodiment, the adjustable panel 142 may fold into the first and second panels 170, 172 along a hinge extending front-to-rear. The adjustable panel 142 may still be hingedly coupled at the rear 116 to convert the entire convertible area 130 to an uncooled compartment. In other embodiments, rather than having the adjustable panel 142 that folds into the first and second panels 170, 172, a vertical panel may be provided that splits the convertible area 130 into different portions either or both of which may be cooled by the chiller 52.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An aircraft comprising:
 a cabin wall defining a cabin;
 a convertible monument in the cabin adjacent the cabin wall, the convertible monument having a plurality of monument walls defining sides, a front, and a rear of the monument surrounding a chamber defined by the monument walls, the convertible monument having a closet component positioned in the chamber for supporting non-perishable items in the chamber, the chamber having an upper compartment and a convertible area below the upper compartment, the upper compartment being an uncooled compartment, the convertible area being convertible between a cooling compartment and an uncooled compartment; and
 a chiller positioned in the chamber proximate the convertible area, the chiller configured to supply cool air to the cooling compartment when operated for cooling perishable items stowed in the cooling compartment, the convertible area being used as an uncooled compartment for stowing non-perishable items when the chiller is inactive.

2. The aircraft of claim 1, wherein the chiller is positioned proximate to a bottom of the chamber at the rear, the cooling compartment being defined between the chiller and the front of the monument.

3. The aircraft of claim 1, wherein the convertible monument includes a panel dividing the convertible monument into an upper portion and a lower portion, the upper portion defining the uncooled upper compartment, the lower portion defining the convertible area, the chiller being positioned in the lower portion, the lower portion being cooled by the chiller when the chiller is operated to convert the lower portion into the cooling compartment, the lower portion defining the uncooled compartment when the chiller is inactive.

4. The aircraft of claim 1, wherein the convertible monument includes an adjustable panel in the convertible area that is movable between a retracted position and an extended position, the adjustable panel closing off the convertible area to define the cooling compartment when in the extended position, the adjustable panel opening up the convertible area to define the uncooled compartment when in the retracted position.

5. The aircraft of claim 4, wherein the adjustable panel is hingedly coupled to one of the monument walls.

6. The aircraft of claim 4, wherein the adjustable panel is oriented horizontally between the sides and between the front and the rear in the extended position.

7. The aircraft of claim 4, wherein the adjustable panel is sealed to the monument walls in the extended position to enclose the cooling compartment to seal the cool air in the cooling compartment.

8. The aircraft of claim 4, wherein the adjustable panel is oriented horizontally in the extended position and is oriented vertically in the retracted position to at least partially cover the chiller.

9. The aircraft of claim 1, wherein the convertible monument includes a door at the front to access the chamber.

10. The aircraft of claim 1, wherein the closet component is a rod for hanging the non-perishable items.

11. The aircraft of claim 1, wherein the closet component being positioned in the upper compartment, the upper compartment being opened to the uncooled compartment when the convertible area is converted as an uncooled compartment, the upper compartment being closed from the cooling compartment when the convertible area is converted as a cooling compartment.

12. The aircraft of claim 6, wherein over-sized non-perishable items too large to fit in the upper compartment are configured to be received in both the upper compartment and the uncooled compartment when the convertible area is converted as the uncooled compartment.

13. The aircraft of claim 1, wherein the chiller is removably coupled to the convertible monument.

14. The aircraft of claim 1, wherein the cooling compartment is sized and shaped for receiving at least one galley cart.

15. The aircraft of claim 1, wherein the chiller is free of condensate discharge plumbing, the chiller configured to discharge condensate into exhaust air from the chiller.

16. The aircraft of claim 1, wherein the convertible area is configured to be divided vertically to define a cooling compartment and an uncooled compartment arranged side-by-side.

17. An aircraft comprising:
 a cabin wall defining a cabin;
 a convertible monument in the cabin adjacent the cabin wall, the convertible monument having a plurality of monument walls defining sides, a front, and a rear of the monument surrounding a chamber defined by the monument walls, the convertible monument having a closet component positioned in the chamber for supporting non-perishable items in the chamber, the convertible monument having an adjustable panel in the chamber movable between a retracted position and an extended position, wherein, in the extended position, the adjustable panel divides the chamber into a cooling compartment below the adjustable panel and an uncooled compartment above the adjustable panel, the entire chamber being an uncooled compartment when the adjustable panel is in the retracted position; and
 a chiller positioned in the chamber below the adjustable panel, the chiller configured to supply cool air to the cooling compartment when the adjustable panel is in the extended position, the cooling compartment configured to stow perishable items therein;
 wherein a volume of the uncooled compartment is greater when the adjustable panel is in the retracted position, the uncooled compartment configured to stow non-perishable items therein.

18. A convertible monument comprising:
 monument walls defining sides, a front, and a rear of the monument extending between a top and a bottom of the monument, the monument walls surrounding a chamber, the chamber having an upper compartment and a convertible area below the upper compartment at the bottom of the monument being convertible between a cooling compartment and an uncooled compartment, the upper compartment being an uncooled compartment;
 a closet component positioned in the chamber for supporting non-perishable items in the uncooled compartment of the chamber; and a chiller positioned in the chamber proximate the convertible area, the chiller configured to supply cool air to the cooling compartment when operated for cooling perishable items stowed in the cooling compartment, the convertible area being used as an uncooled compartment for stowing non-perishable items when the chiller is inactive.

19. The convertible monument of claim 18, wherein the chiller is positioned proximate to the bottom of the chamber at the rear, the cooling compartment being defined between the chiller and the front of the monument.

20. The convertible monument of claim 18, wherein the convertible monument includes a panel dividing the convertible monument into an upper portion and a lower portion, the upper portion defining the uncooled upper compartment, the lower portion defining the convertible area, the chiller being positioned in the lower portion, the lower portion being cooled by the chiller when the chiller is operated to convert the lower portion into the cooling compartment, the lower portion defining the uncooled compartment when the chiller is inactive.

* * * * *